United States Patent
Losh

(10) Patent No.: US 9,501,169 B2
(45) Date of Patent: Nov. 22, 2016

(54) ACQUIRING MULTIPLE CAPACITIVE PARTIAL PROFILES WITH ORTHOGONAL SENSOR ELECTRODES

(71) Applicant: Synaptics Incorporated, San Jose, CA (US)

(72) Inventor: Jonathan Losh, Mountain View, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 34 days.

(21) Appl. No.: 14/318,219

(22) Filed: Jun. 27, 2014

(65) Prior Publication Data

US 2015/0378495 A1    Dec. 31, 2015

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 6,879,930 B2 | 4/2005 | Sinclair et al. | |
| 7,911,456 B2* | 3/2011 | Gillespie | G06F 3/03547 345/173 |
| 8,278,571 B2 | 10/2012 | Orsley | |
| 8,294,687 B1 | 10/2012 | Ksondzyk | |
| 8,542,215 B2 | 9/2013 | Hanauer et al. | |
| 2010/0026655 A1 | 2/2010 | Harley | |
| 2010/0292945 A1* | 11/2010 | Reynolds | G06F 3/044 702/65 |
| 2010/0302201 A1 | 12/2010 | Ritter et al. | |
| 2011/0057670 A1* | 3/2011 | Jordan | G06F 3/0416 324/679 |
| 2011/0141053 A1* | 6/2011 | Bulea | G06F 3/0416 345/174 |
| 2011/0148436 A1* | 6/2011 | Dattalo | G06F 3/0416 324/663 |
| 2011/0148438 A1* | 6/2011 | Dattalo | G06F 3/0416 324/671 |
| 2011/0175835 A1 | 7/2011 | Wang | |
| 2011/0279409 A1 | 11/2011 | Salaverry et al. | |
| 2012/0068966 A1* | 3/2012 | Washburn | G06F 3/044 345/174 |
| 2012/0113047 A1 | 5/2012 | Hanauer et al. | |
| 2012/0229418 A1 | 9/2012 | Schwartz et al. | |
| 2012/0229419 A1 | 9/2012 | Schwartz et al. | |
| 2012/0319988 A1* | 12/2012 | Schwartz | G06F 3/044 345/174 |
| 2012/0323524 A1 | 12/2012 | Hatano | |
| 2013/0002579 A1 | 1/2013 | Hatano | |

FOREIGN PATENT DOCUMENTS

| | | |
|---|---|---|
| TW | 201203057 A | 1/2012 |
| WO | WO-2013069290 A1 | 5/2013 |

\* cited by examiner

*Primary Examiner* — David D Davis
(74) *Attorney, Agent, or Firm* — Patterson + Sheridan, LLP

(57) ABSTRACT

Embodiments include a method, input device, and processing system for driving a plurality of sensor electrodes for capacitive sensing. The method includes acquiring a first capacitive partial profile by driving a capacitive sensing signal onto a first sensor electrode of a first plurality of sensor electrodes while driving a second sensor electrode of the first plurality of sensor electrodes with a substantially constant voltage. The method further includes acquiring a second capacitive partial profile by driving the capacitive sensing signal onto the second sensor electrode while driving the first sensor electrode with the substantially constant voltage, and determining a first capacitive profile based on at least the acquired first and second capacitive partial profiles.

21 Claims, 8 Drawing Sheets

ACQUIRING MULTIPLE CAPACITIVE PARTIAL PROFILES WITH ORTHOGONAL SENSOR ELECTRODES

BACKGROUND OF THE INVENTION

Field of the Invention

Embodiments of the present invention generally relate to a method and apparatus for performing interleaved capacitive sensing to improve sensing performance.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones or tablet computers).

SUMMARY OF THE INVENTION

One embodiment described herein is a processing system comprising a sensor module coupled to a plurality of sensor electrodes, where the sensor module is configured to drive various ones of the plurality of sensor electrodes. During a first time period, the sensor module simultaneously drives a capacitive sensing signal onto a first sensor electrode of the plurality of sensor electrodes, and a substantially constant voltage onto a second sensor electrode of the plurality of sensor electrodes. During the first time period, the sensor module acquires a first capacitive partial profile based on the driven capacitive sensing signal. During a second time period (that is non-overlapping with the first time period), the sensor module simultaneously drives the capacitive sensing signal onto the second sensor electrode and the substantially constant voltage onto the first sensor electrode. During the second time period, the sensor module acquires a second capacitive partial profile based on the driven capacitive sensing signal. During at least one of the first and second time periods, the sensor module also drives one or more sensor electrodes of a second plurality of sensor electrodes with the substantially constant voltage, the second plurality of sensor electrodes disposed substantially orthogonal to the first plurality of sensor electrodes. The processing system further includes a determination module that determines a first capacitive profile based on at least the acquired first and second capacitive partial profiles.

Another embodiment described herein is a method for driving a plurality of sensor electrodes for capacitive sensing, in which a first capacitive partial profile is acquired during a first time period by driving a capacitive sensing signal onto a first sensor electrode of a first plurality of sensor electrodes, while driving a second sensor electrode of the first plurality of sensor electrodes with a substantially constant voltage. During a second time period, a second capacitive partial profile is acquired by driving the capacitive sensing signal onto the second sensor electrode while driving the first sensor electrode with the substantially constant voltage. The method further includes driving one or more sensor electrodes of a second plurality of sensor electrodes with the substantially constant voltage during at least one of the first and second time periods, and determining a first capacitive profile for a sensing region based on at least the first and second capacitive partial profiles. The second plurality of sensor electrodes is disposed substantially orthogonal to the first plurality of sensor electrodes.

Another embodiment described herein is an input device comprising a plurality of sensor electrodes, which includes a first plurality of sensor electrodes arranged along a first sensing axis. The input device further comprises a processing system coupled to the plurality of sensor electrodes and configured to acquire a first capacitive partial image during a first time period by driving a capacitive sensing signal onto a first sensor electrode of the first plurality of sensor electrodes, while driving a second sensor electrode of the first plurality of sensor electrodes with a substantially constant voltage. During a second time period, the processing system acquires a second capacitive partial image by driving the capacitive sensing signal onto the second sensor electrode while driving the first sensor electrode with the substantially constant voltage. The processing system of the input device is further configured to determine a first capacitive profile based on at least the first and second capacitive partial profiles.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
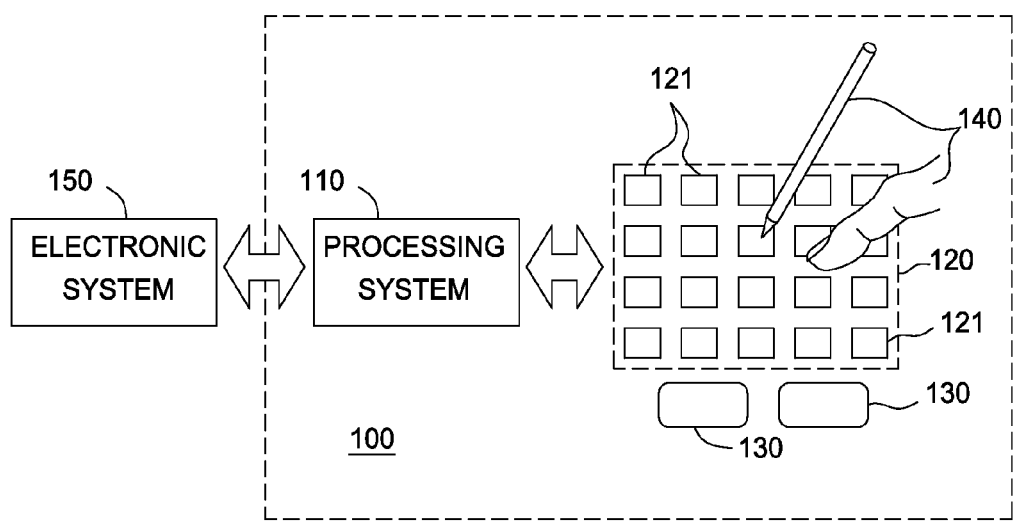
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Techniques for interleaved capacitive sensing are disclosed, in which an input device acquires a first capacitive partial profile during a first time period by driving a capacitive sensing signal onto a first sensor electrode of a first plurality of sensor electrodes, while driving a second sensor electrode of the first plurality of sensor electrodes with a substantially constant voltage. During a second time period, the input device generates a second capacitive partial profile by driving the capacitive sensing signal onto the second sensor electrode while driving the first sensor electrode with the substantially constant voltage. During at least one of the first and second time periods, one or more sensor electrodes of a second plurality of sensor electrodes disposed orthogonal to the first plurality are driven with the substantially constant voltage. The input device determines a first capacitive profile for a sensing region based on at least the first and second capacitive partial profiles. By providing one or more sensor electrodes driven with the substantially constant voltage, the input device may improve its ability to detect input objects, including those that are ungrounded or weakly grounded. By improving detectability of these input objects, measurement accuracy and capacitive sensing performance may also be improved.

FIG. 1 is a schematic block diagram of an input device 100, in accordance with embodiments described herein. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises a plurality of sensing elements 121 for detecting user input. The input device 100 may include one or more sensing elements 121 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing elements 121 to detect input, identification modules configured to identify gestures such as mode changing gestures, and mode changing modules for changing operation modes. In one embodiment, processing system 110 includes at least one sensor module, and a display driver module, each of which will be described more fully below.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a display region 145 in addition to the sensing region 120 (e.g., a touch screen interface), and the sensing region 120 overlaps at least part of an active area of a display screen of the display region 145. For example, the input device 100 may comprise substantially transparent sensing elements overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The sensing region 120 and the display region 145 may share physical elements. For example, some embodiments may utilize some of the same electrical components for displaying and for sensing. As another example, the display device may be operated in part or in total by the processing system 110 (e.g., by display driver module 215).

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
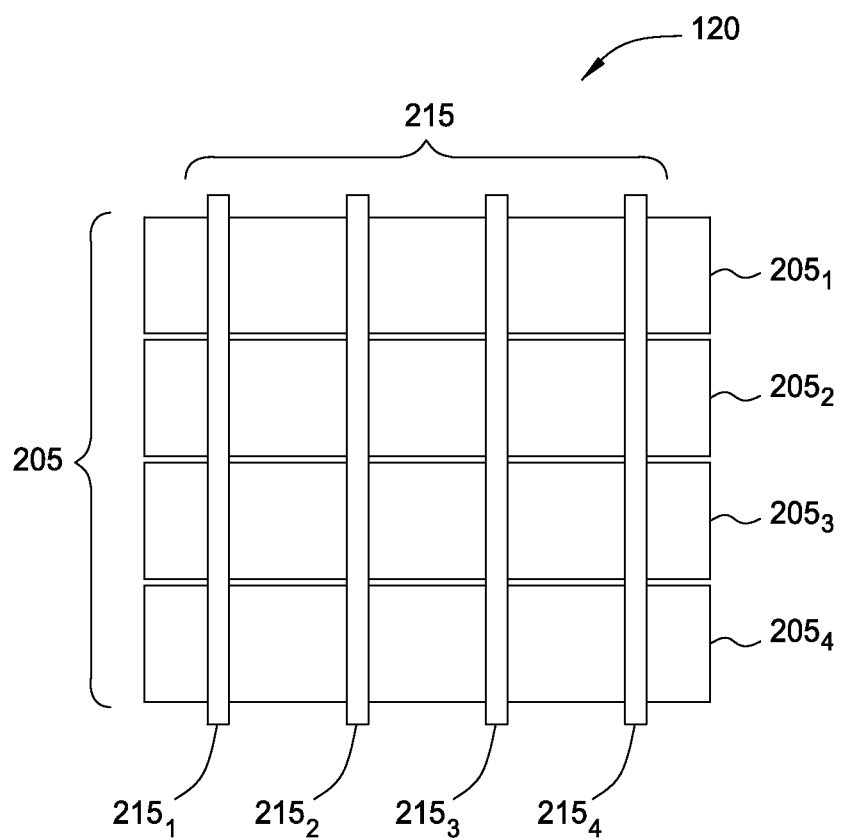
FIGS. 2A and 2B illustrate portions of exemplary patterns of sensing elements or capacitive sensing pixels, according to embodiments described herein.

FIG. 2A illustrates a portion of a pattern of sensing elements configured to sense in a sensing region 120 associated with the pattern, according to several embodiments. For clarity of illustration and description, FIG. 2A shows the sensing elements in a pattern of simple rectangles, and does not show various components. This pattern of sensing elements comprises a first plurality of sensor electrodes 205 ($205_1$, $205_2$, $205_3$, ... $205_m$), and a second plurality of sensor electrodes 215 ($215_1$, $215_2$, $215_3$, ... $215_n$) disposed over the plurality of sensor electrodes 205. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together. In some embodiments, the first plurality of sensor electrodes 205 and the second plurality of sensor electrodes 215

In one embodiment, the first plurality of sensor electrodes 205 may extend in a first direction while the second plurality of sensor electrodes 215 extend in a second direction. As shown in FIG. 2A, the first plurality of sensor electrodes 205 extend in one direction, while the second plurality of sensor electrodes 215 extend in a direction substantially orthogonal to the transmitter electrodes. Of course, other orientations are possible (e.g., parallel or other relative orientations).

As will be discussed further below, the areas of localized capacitive coupling between the first plurality of sensor electrodes 205 and the second plurality of sensor electrodes 215 may be termed "capacitive pixels." The capacitive coupling between the first plurality of sensor electrodes 205 and the second plurality of sensor electrodes 215 change with the proximity and motion of input objects in the sensing region associated with the first plurality of sensor electrodes 205 and the second plurality of sensor electrodes 215.

Figure 2B:
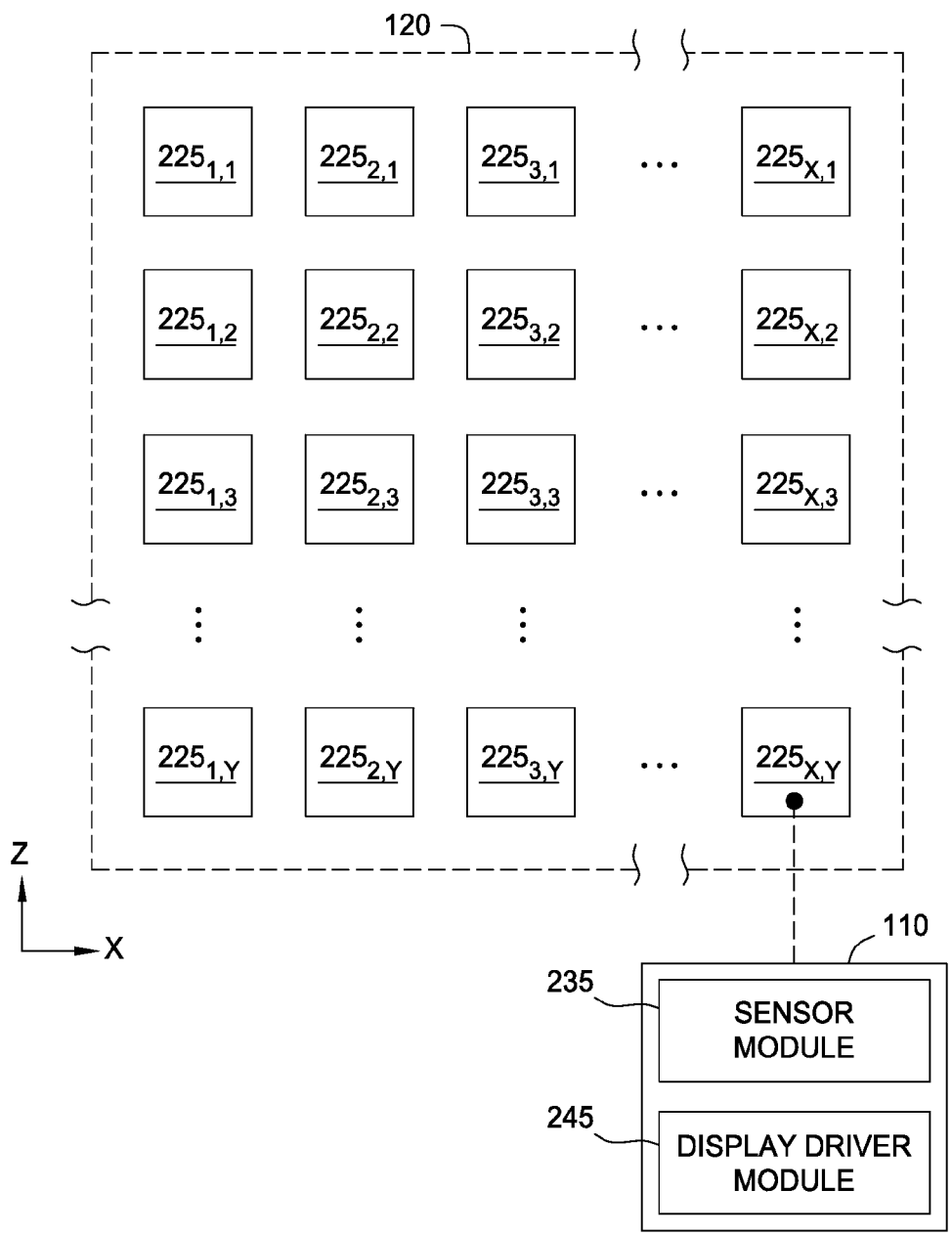

FIG. 2B illustrates a portion of a pattern of capacitive sensing pixels 225 (also referred to herein as capacitive pixels or sensing pixels) configured to sense in the sensing region 120 associated with a pattern, according to some embodiments. Each capacitive pixel 225 may include one of more of the sensing elements described above. In one embodiment, a respective sensor electrode may correspond to each capacitive pixel (i.e., in a 1:1 ratio), and each of the sensor electrodes may have a similar shape, size, and/or alignment with its respective capacitive pixel. Of course, other configurations are also contemplated, such as the embodiment depicted in FIG. 2A, in which the areas of localized coupling between transmitter electrodes and receiver electrodes comprise the capacitive sensing pixels 225. In these other configurations, the sensor electrodes need not correspond to the capacitive pixels in the same 1:1 ratio. For clarity of illustration and description, FIG. 2B presents the regions of the capacitive pixels 225 in a pattern of simple rectangles and does not show various other components within the capacitive pixels 225. In one embodiment, the capacitive sensing pixels 225 are areas of localized capacitance (capacitive coupling). Capacitive pixels 225 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 225, and thus may be used as an indicator of the presence of the input object in the sensing region 120 of the input device.

The exemplary pattern comprises an array of capacitive sensing pixels $225_{X,Y}$ arranged in a matrix array of X columns and Y rows, where X and Y are positive integers. It is contemplated that the pattern of sensing pixels 225 may comprises a plurality of sensing pixels 225 having other configurations, such as polar arrays, repeating patterns, non-repeating patterns, non-uniform arrays a single row or column, or other suitable arrangement. As shown here, the sensing pixels 225 are coupled to the processing system 110 and utilized to determine the presence (or lack thereof) of an input object in the sensing region 120.

In a first mode of operation, at least one sensor electrode within the capacitive sensing pixels 225 may be utilized to detect the presence of an input object via absolute sensing techniques. Processing system 110 is configured to drive a sensor electrode in each capacitive pixel 225 with a modulated signal and measure a capacitance between the sensor electrode and the input object (e.g., free space or earth ground) based on the modulated signal, which is utilized by the processing system 110 or other processor to determine the position of the input object.

The various electrodes of capacitive pixels 225 are typically ohmically isolated from the electrodes of other capacitive pixels 225. Additionally, where a capacitive pixel 225 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 225 are utilized to detect the presence of an input object via transcapacitance sensing techniques. That is, processing system 110 may drive at least one sensor electrode in a capacitive pixel 225 with a transmitter signal and receive resulting signals using one or more of the other sensor electrodes in the capacitive pixel 225, where a resulting signal comprising effects corresponding to the transmitter signal. The resulting signals are utilized by the processing system 110 or other processor to determine the position of the input object.

The input device 100 may be configured to operate in any one of the modes described above. The input device 100 may also be configured to switch between any two or more of the modes described above. Input device 100 may be configured to perform "hybrid sensing," where absolute capacitance and transcapacitance techniques are performed in relatively rapid succession. For example, a single sensing cycle or period, or sequential sensing cycles or periods, may include one or more absolute capacitance measurements and one or more transcapacitance measurements, and the results of each type of measurement may be combined to determine the position of the input object.

In some embodiments, the capacitive pixels 225 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 225.

In other embodiments, "scanning" capacitive pixels 225 to determine these capacitive couplings includes driving with a modulated signal and measuring the absolute capacitance of one or more of the sensor electrodes. In another embodiment, the sensor electrodes may be operated such that the modulated signal is driven onto a sensor electrode in multiple capacitive pixels 225 at the same time. In such embodiments, an absolute capacitive measurement may be obtained from each of the one or more capacitive pixels 225 simultaneously. In one embodiment, the input device 100 simultaneously drives a sensor electrode in a plurality of capacitive pixels 225 and measures an absolute capacitive measurement for each of the capacitive pixels 225 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the capacitive pixels 225 form a capacitive image (also referred to as a capacitive frame) representative of the capacitive couplings at the capacitive pixels 225 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some embodiments, one or more of the sensor electrodes in the capacitive pixels 225 include one or more display electrodes used in updating the display of the display screen. In one or more embodiments, the display electrodes comprise one or more segments of a Vcom electrode (common electrode), a source drive line, a gate line, an anode electrode or cathode electrode, or any other display element. These display electrodes may be disposed on an appropriate display screen substrate. For example, the electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions. Though discussed in regard to FIG. 2B, it is explicitly contemplated that alternate configurations and embodiments, such as the configuration of sensor electrodes depicted in FIG. 2A, may include display electrodes and/or combination electrodes that are used according to the various techniques described herein.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Continuing to refer to FIG. 2B, the processing system 110 coupled to the sensing electrodes includes a sensor module 235 and optionally, a display driver module 245. In one embodiment, the sensor module 235 comprises circuitry configured to drive a transmitter signal or a modulated signal onto the sensing electrodes, and to receive the resulting signals on the sensing electrodes during periods in which input sensing is desired. In one embodiment, the sensor module 235 is configured to drive each sensor electrode with a modulated signal, and to measure a capacitance between the sensor electrode and the input object based on the modulated signal. The measured capacitance may then be utilized by the processing system 110 or other processor to determine the position of the input object. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 235 may be selectively coupled to one or more of the sensor electrodes in the capacitive pixels 225. For example, the sensor module 235 may be coupled to selected portions of the sensor electrodes and operate in either an absolute or transcapacitance sensing mode. In another example, the sensor module 235 may be coupled to different sensor electrodes when operating in the absolute sensing mode than when operating in the transcapacitance sensing mode.

In various embodiments, the sensor module 235 may comprise circuitry configured to receive a resulting signal with the sensing electrodes, the resulting signal comprising effects corresponding to the transmitter signal during periods in which input sensing is desired. In one or more embodiments, the sensor module 235 is configured to drive a modulated signal onto a first sensor electrode in one of the capacitive pixels 225 and receive a resulting signal corresponding to the modulated signal to determine changes in absolute capacitance of the sensor electrode. The sensor module 235 may determine a position of the input object in the sensing region 120 or may provide a signal including information indicative of the resulting signal to a separate module or processor, for example, a determination module or a processor of the electronic device (i.e., a host processor), for determining the position of the input object in the sensing region 120. In one embodiment, the sensor module 235 may comprise separate transmitter and/or receiver modules for performing the various functions described herein. In one embodiment, the sensor module 235 comprises a plurality of receivers, where each receiver may include an analog front end (AFE).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period of one display line. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 245 includes circuitry configured to provide display image update information to the display of the display device during non-sensing (e.g., display updating) periods. The display driver module 245 may be included with or separate from the sensor module 235. In one embodiment, the processing system 110 comprises a first integrated controller comprising the display driver module 245 and at least a portion of the sensor module 235 (e.g., a transmitter module and/or a receiver module). In another embodiment, the processing system 110 comprises a first integrated controller comprising the display driver module 245 and a second integrated controller comprising the sensor module 235. In yet another embodiment, the processing system comprises a first integrated controller comprising a display driver module 245 and one of a first portion of sensor module 235, and a second integrated controller comprising a second portion of sensor module 235.

Figure 3A:
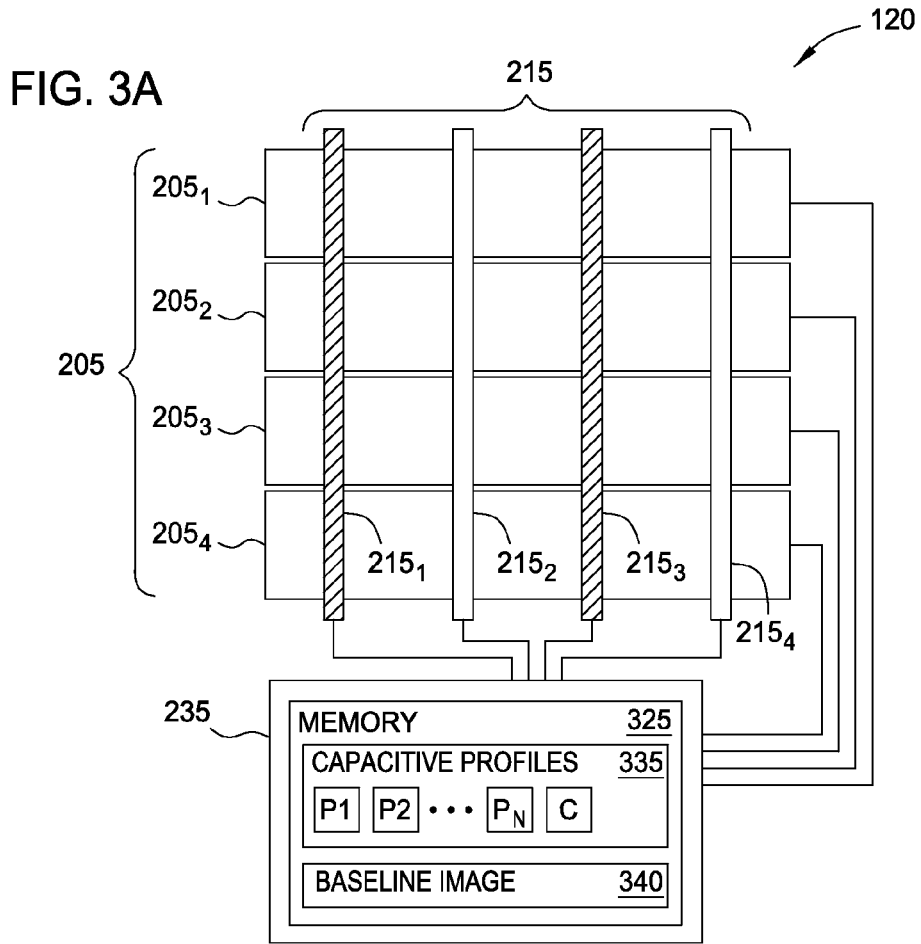
FIGS. 3A and 3B illustrate a portion of a pattern of sensing elements configured to perform interleaved capacitive sensing for a sensing region, according to one embodiment.
Figure 3B:
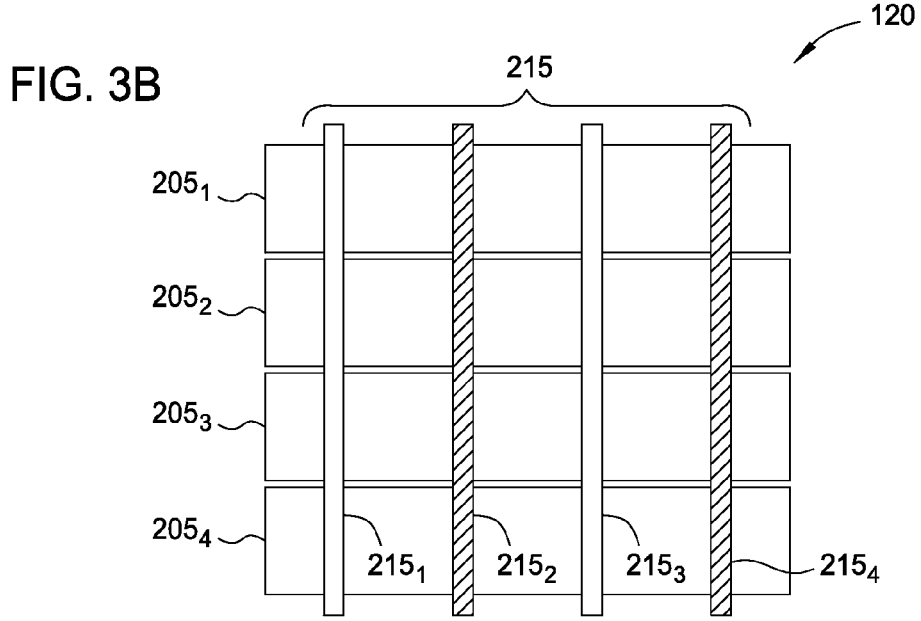

FIGS. 3A and 3B illustrate a portion of a pattern of sensing elements configured to perform interleaved capacitive sensing for a sensing region, according to one embodiment. Similar to FIG. 2A, the pattern of sensing elements in FIG. 3A includes a first plurality of sensor electrodes 205, and a second plurality of sensor electrodes 215 disposed over the plurality of sensor electrodes 205. The different pluralities of sensor electrodes may be disposed in a common plane, or may be in different planes separated by an insulating material. Sensor electrodes disposed in a substantially common plane may also have an insulating material disposed between them at areas of intersection, in order to avoid electrical connectivity. The sensor electrodes 205, 215 are coupled to sensor module 235 that is generally used to acquire data from sensor electrodes and perform various calculations to determine positional information of an input object. The sensor module 235 may be further configured to drive selected sensor electrodes 205, 215 to a reference voltage, such as a Vcom voltage (e.g., a system ground), a direct current (DC) voltage, and/or to hold the sensor electrodes 205, 215 in a high-impedance state. Sensor module 235 also includes a memory 325 that may be configured to store one or more baseline images and capacitive sensing images (also referred to as images), as well as other useful data acquired by the sensor electrodes 205, 215. Memory 325 includes capacitive profiles 335, which may include one or more partial capacitive profiles $P_1$-$P_n$, one or more complete capacitive profiles C, and one or more capacitive baseline images 340. The profiles 335 may be stored in memory 325 in any suitable formats, including as raw sensor data, as difference values from another profile or from a capacitive image, scaled, compressed, encoded, and so forth. Whatever the formatting, capacitive profiles 335 generally comprise data matrices that indicate data acquired by one or more of the sensor electrodes 205, 215 during sensing.

In one embodiment, the processing system may use using sensor module 235 to acquire a capacitive baseline image 340 prior to performing input sensing operations (i.e., sensing the presence and/or movement of input objects). For example, a baseline image may be acquired when the sensor module 235 is first turned on from a powered-off state, sleep state, or other low-power state. Ideally, the baseline image 340 may reflect the background capacitance of the input device, absent any effects caused by an input object in the sensing region 120. By accurately measuring the background capacitance, which may vary based on the environment and other operating conditions, certain effects on other measurements using the sensor electrodes may be accounted for, and generally more accurate input sensing may result. Of course, measurements may be taken periodically to update capacitive baseline images, and differences between baseline images may be used to detect and compensate for drift in sensor measurements (or other conditions).

In some cases, the measurement for the baseline image 340 may occur while an input object is present in the sensing region 120, so that the effects of the input object are reflected in the measurement. When the input device performs subsequent input sensing, the capacitive sensing images may be inaccurate due to the altered baseline image, which may cause degraded sensing performance (e.g., false inputs, non-detection or inaccurate detection of inputs).

To a limited extent, an input object that is detected in the baseline image may be compensated for so that the adjusted baseline image may more accurately reflect the background capacitance of the input device. However, these techniques may require estimation or other less precise calculations, and thus may not be able to completely negate the effects of the input object. Additionally, certain input objects may be undetectable or partially undetectable by one or more types of capacitive sensing. That is, electrical properties of an input object may be such that certain capacitive sensing measurements (e.g., absolute capacitive sensing) do not indicate the presence of the input object, or indicate the presence of the input object with a reduced degree of confidence while other capacitive sensing measurements (e.g., transcapacitive sensing) detect the input object.

So then, depending on which capacitive sensing technique is used, a baseline image taken with an input object present may incorrectly be labeled as being accurate (i.e., as without an input object present). This may lead to errors in systems that use multiple types of capacitive sensing, such as hybrid sensing, as the "accurate" baseline image acquired using one type of sensing may cause spurious results when another type of sensing is used.

For example, input objects that are ungrounded, or weakly coupled to ground, may cause differing results based on the type of capacitive sensing performed. Some examples of a weakly grounded or ungrounded input object include a coin (or other conductive object) on the surface of the input device, and a gloved or covered finger. Using transcapacitive sensing, the ungrounded object may appear as an indeterminate mix of positive and negative charges. In absolute sensing, the ungrounded input object (having essentially a floating voltage) may not appear in the capacitive image at all. Similar results may also occur in the opposite case, in which the input object is grounded, but the input device is ungrounded or weakly grounded. For example, an input device such as a phone may be resting on furniture with a relatively well-grounded user providing input.

In one embodiment, the sensor module 235 may acquire a plurality of partial capacitive profiles and combine them to create a complete capacitive profile. The complete capacitive profiles may be compared against each other, as well as against the baseline image, to better detect input in the sensing region 120.

FIG. 3A illustrates a portion of a pattern of sensing elements configured to perform interleaved capacitive sensing for a sensing region at a first time. The sensor module 235 drives a capacitive sensing signal onto a subset of the plurality of sensor electrodes 215 to create a first partial capacitive profile P1 while driving one or more other sensor electrodes with a substantially constant voltage. Consistent with the descriptions provided above, the capacitive sensing signal may be a modulated signal used to perform absolute capacitive sensing, or a transmitter signal used to perform transcapacitive sensing. Generally, the capacitive sensing signal may use any waveform and frequency suitable for capacitive sensing. As shown, the sensor electrodes $215_1$, $215_3$ are driven with the capacitive sensing signal at the first time (indicated by the hatched pattern). While the capacitive sensing signal is driven onto sensor electrodes $215_1$, $215_3$, sensor module 235 also drives one or more other sensor electrodes $215_2$, $215_4$ with a substantially constant voltage. Sensor module 235 may further drive some or all of the sensor electrodes $205_1$-$205_4$ (which in one embodiment, are disposed beneath the sensor electrodes 215) with the substantially constant voltage. In various embodiments, the substantially constant voltage may be a system ground or an earth ground, a Vcom voltage, or a DC potential (positive or negative). The voltage level may be selected to provide improved coupling with an ungrounded or weakly grounded input object.

By driving one or more of the plurality of sensor electrodes 205, 215 with a substantially constant voltage, additional parallel coupling paths are provided from the input device to the ungrounded (or weakly grounded) input object. By providing an increased capacitive coupling between the input device and the input object, the previously ungrounded/weakly grounded input object may be better and/or more predictably detected by various capacitive sensing techniques. Additionally, by driving sensor electrodes $205_1$-$205_4$ with the substantially constant voltage, the capacitive coupling for the input object may also be improved, as additional paths are provided from the substantially constant voltage to the input object. In some embodiments, additional paths for the input object to couple to the substantially constant voltage may also be provided using other components of the input device, and preferably using components located within the sensing region 120. For example, one or more of the display electrodes may also be driven with the substantially constant voltage to improve coupling and detectability of the input device.

FIG. 3B illustrates a portion of a pattern of sensing elements configured to perform interleaved capacitive sensing for a sensing region at a second time. For example, the second time may follow the first time depicted in FIG. 3A, such as later during the same sensing cycle, or perhaps in a subsequent sensing cycle. While sensor module 235 is not explicitly depicted in FIG. 3B, the same sensor module may be used to perform the interleaved capacitive sensing shown in FIG. 3B (as well as FIGS. 4A-4D, discussed below).

At the second time, the sensor module 235 drives a capacitive sensing signal onto a second subset of the plurality of the sensor electrodes 215 to create a second partial capacitive profile P2 while driving one or more other sensor electrodes with a substantially constant voltage. As shown, the sensor electrodes $215_2$, $215_4$ are driven with the capacitive sensing signal while sensor module 235 drives the sensor electrodes $215_1$, $215_3$ with a substantially constant voltage. This voltage may generally be the same voltage as that selected above during the first time. The sensor module 235 may also drive some or all of the sensor electrodes $205_1$-$205_4$ (disposed beneath the sensor electrodes 215) with the substantially constant voltage at the second time.

In the simplified example illustrated in FIGS. 3A and 3B, the partial capacitive profile P1 represents capacitive sensing data from the odd-numbered electrodes ($215_1$, $215_3$), and the partial capacitive image P2 reflects data from the even-numbered electrodes ($215_2$, $215_4$). The partial capacitive images may be combined to create a complete capacitive profile C for the sensing region 120. By using the partial capacitive profiles to create the capacitive profile C, capacitive sensing may be performed for sensor electrodes in the sensing region while improving coupling (and thus detectability) of the ungrounded or weakly grounded input object.

By better detecting the input object, a capacitive baseline image may be correctly identified as "inaccurate," or the effects of the input object on the capacitive baseline image may be compensated for. In one embodiment, the capacitive baseline image may be compared with the capacitive profile C in order to determine an updated capacitive baseline image. In another embodiment, the capacitive profile C may itself be used as the capacitive baseline image.

In other embodiments, and as will be discussed further below, different combinations and/or sequences of driving sensor electrodes are explicitly contemplated to be within the scope of this disclosure.

FIGS. 4A-4D illustrate a portion of a pattern of sensing elements configured to perform interleaved capacitive sensing for a sensing region, according to one embodiment. In the example illustrated by FIGS. 4A-4D, the plurality of sensor electrodes 215 corresponding to the sensing region 120 are scanned. During the scan, each sensor electrode may be separately driven with a capacitive sensing signal. Capacitive sensing data received from each sensor electrode may then correspond to a separate partial capacitive profile (i.e., a 1:1 ratio of sensor electrodes to partial profiles). The partial capacitive profiles may be combined to construct a complete capacitive profile for the sensing region 120. Similar to FIGS. 3A and 3B above, sensor module 235 of a processing system 110 may be used to perform the capacitive sensing functions (transmitting and receiving) using sensor electrodes 205, 215.

Figures 4A, 4B:
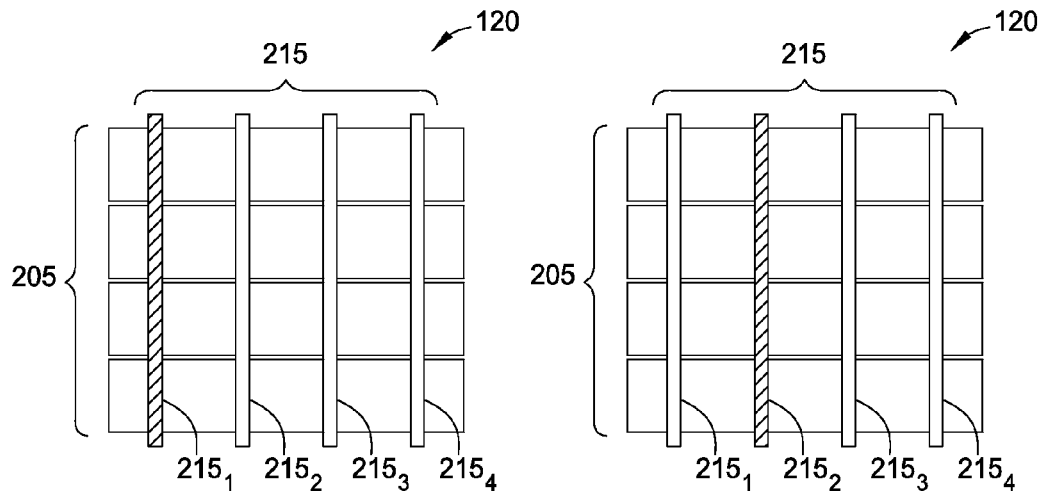
FIGS. 4A-4D illustrate a portion of a pattern of sensing elements configured to perform interleaved capacitive sensing for a sensing region, according to one embodiment.

FIG. 4A illustrates a portion of a pattern of sensing elements configured to perform interleaved capacitive sensing for a sensing region at a first time. Sensor module 235 drives a capacitive sensing signal onto sensor electrode $215_1$, while driving remaining sensor electrodes from the plurality (sensor electrodes $215_2$-$215_4$) with a substantially constant voltage. In another embodiment, a subset of the remaining sensor electrodes may be driven with a substantially constant voltage. The sensor module 235 may also drive the other plurality of sensor electrodes 205 with the substantially constant voltage. In this example, driving a maximum (or at least a greater) number of the plurality of sensor electrodes 205, 215 with a substantially constant voltage while performing capacitive sensing provides additional coupling paths from the input device to the input object. Here, all of the sensor electrodes 205, and all but one of sensor electrodes 215 are driven to the substantially constant voltage while capacitive sensing is performed using sensor electrode $215_1$. Accordingly, the input object may be better and/or more predictably detected by the capacitive sensing techniques. The capacitive sensing data received from driving sensor electrode $215_1$ at the first time may be stored as a partial capacitive profile.

Figures 4C, 4D:
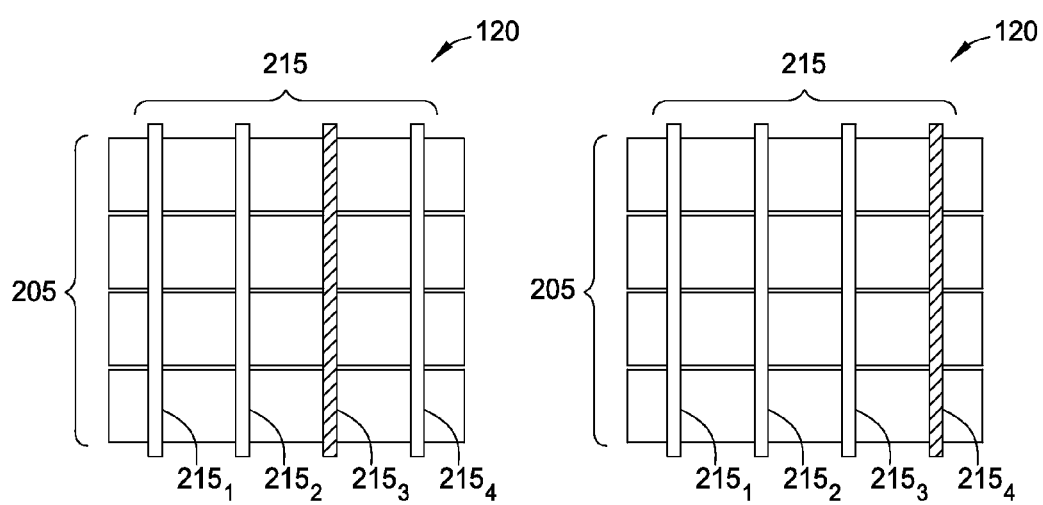

FIG. 4B illustrates the interleaved capacitive sensing at a second time, where sensor electrode $215_2$ is driven with the capacitive sensing signal and the remaining sensor electrodes $215_1$, $215_3$, $215_4$ are driven with the substantially constant voltage. FIG. 4C illustrates the interleaved capacitive sensing at a third time (driving sensor electrode $215_3$ with the capacitive sensing signal), and FIG. 4D at a fourth time (driving sensor electrode $215_4$). For each of these times, and corresponding to each individual sensor electrode 215, a separate partial capacitive profile may be created. After completing the scan of the plurality of sensor electrodes 215, the various partial capacitive profiles may be combined to create a complete capacitive profile for the sensing region 120.

FIGS. 3A and 3B illustrate one example of acquiring two partial capacitive profile (driving "odds" and "evens" at separate times), and FIGS. 4A-4D illustrate another example in which four partial capacitive profiles are acquired ("scan"). Of course, any other number of partial capacitive profiles may be selected. The number of partial capacitive profiles may be chosen based on the computing requirements (e.g., processing, memory, energy) for acquiring the profiles, and/or based on timing considerations. For example, capacitive sensing periods may be of a finite duration (i.e., not continuously sensing), and sensor module 235 is able to acquire a limited number of measurements and/or profiles during that time period.

To create a complete capacitive profile, it may be desirable to acquire at least some sensing data for each sensor electrode in the sensing region during the time period. In one example, the sensor module may obtain measurements that include each sensor electrode once. This could include patterns such as alternating "odds" and "evens," or a systematic "scan" of single sensor electrodes. However, other examples may include overlapping measurements (where certain sensor electrodes may be included in multiple measurements taken by the sensor module). In these examples, additional processing may be required to produce a suitable complete capacitive profile, such as selecting one of the multiple measurements to represent the particular sensor electrode, or averaging a plurality of measurements that correspond to the particular sensor electrode.

Different combinations and/or sequences of driving sensor electrodes may also be used to acquire the partial capacitive profiles, consistent with the computing requirements and/or timing requirements discussed above. For example, a plurality of adjacent sensor electrodes may be driven simultaneously (such as sensor electrodes $215_1$, $215_2$ driven at a first time, and sensor electrodes $215_3$, $215_4$ driven at a second time). Sensor electrodes may be driven in a different sequence (e.g., driven in a different direction or selected in a non-continuous or partially continuous sequence). Particular sensor electrodes may be driven while acquiring multiple partial capacitive profiles. Different numbers of sensor electrodes may be driven with a capacitive sensing signal at different times. Of course, combinations of any of the above features may also be used.

Additionally, other sensor electrode configurations may be used to acquire partial capacitive profiles using the principles and techniques described above. For example, partial capacitive profiles may be obtained using a matrix array of X columns and Y rows of sensor electrodes corresponding to a particular sensing region. The sensor module 235 may sense on a subset of the sensor electrodes of the matrix array to create the first partial capacitive profile, driving the subset of sensor electrodes with the capacitive sensing signal while driving the other sensor electrodes with the substantially constant voltage. Of course, any number of patterns or sequences are possible (e.g., a scanning pattern with one or more sensor electrodes, driving individual rows and/or columns of sensor electrodes, driving in an alternating checkerboard pattern, and so forth). Acquiring subsequent partial capacitive profiles may include driving the other sensor electrodes that were not driven during the first partial capacitive profiles. The resulting partial capacitive profiles may be combined to create a complete capacitive profile.

By acquiring capacitive profiles using the techniques discussed above, input devices may achieve better detection of ungrounded or weakly grounded input objects, and may thus be able to compensate for the effects caused by the state of the input objects or the capacitive sensing device itself. Baseline capacitive images may also have increased accuracy, which may lead to better measurements and improved sensing performance.

By using these techniques, certain deficiencies experienced in one mode of capacitive sensing may be compensated for using other modes of sensing. Continuing with an earlier example, transcapacitive sensing of a weakly grounded input object in a baseline image may generate sensing data from which the presence, size, location, and/or movement of an input object cannot be suitably determined. Upon determining the sensing data to be so indeterminate, or perhaps upon determining that sensing performance decreases below a threshold (e.g., SNR or bit error rate), a processing system may select another type of capacitive sensing to acquire data about the input object. For example, the processing system may use interleaved absolute capacitive sensing to improve coupling with the input object, and to thus acquire better data regarding the input object. Much in the same way, the accuracy of measurements using one mode of capacitive sensing may also be verified by using another mode of sensing.

Additionally, the better detection of ungrounded or weakly-grounded input objects may provide improved sensing performance under various conditions. For example, using interleaved capacitive sensing may increase sensitivity of the input device to input objects generally, so that an input object may be detected at an increased distance from the surface (i.e., at an increased "hover height"). Additionally, interleaved sensing may provide improved performance for a user having reduced coupling to ground (e.g., wearing a glove while manipulating a finger or stylus, a dirty hand, etc.).

In one embodiment, the interleaved capacitive sensing may be performed selectively within the sensing region. For example, a weakly-grounded input object may be identified in a capacitive baseline image near a few of the plurality of sensing electrodes. In response, the processing system may attempt to acquire more information about the input object by driving the capacitive sensing signal in a pattern that includes those few electrodes, creating one or more corresponding partial capacitive profiles. These partial capacitive profiles may be compared against the baseline image, or perhaps other measured complete or partial profiles. Such an approach thus provides a more economical use of computing resources and time.

In one embodiment, the processing system may obtain partial capacitive profiles for the sensing region using a second plurality of sensor electrodes, and may combine these with partial capacitive profiles from the first plurality to generate a complete capacitive profile for the sensing region. The second plurality of sensor electrodes may be aligned with a different sensing axis than that of the first plurality, such as orthogonal to the sensing axis corresponding to the first plurality.

Figure 5A:
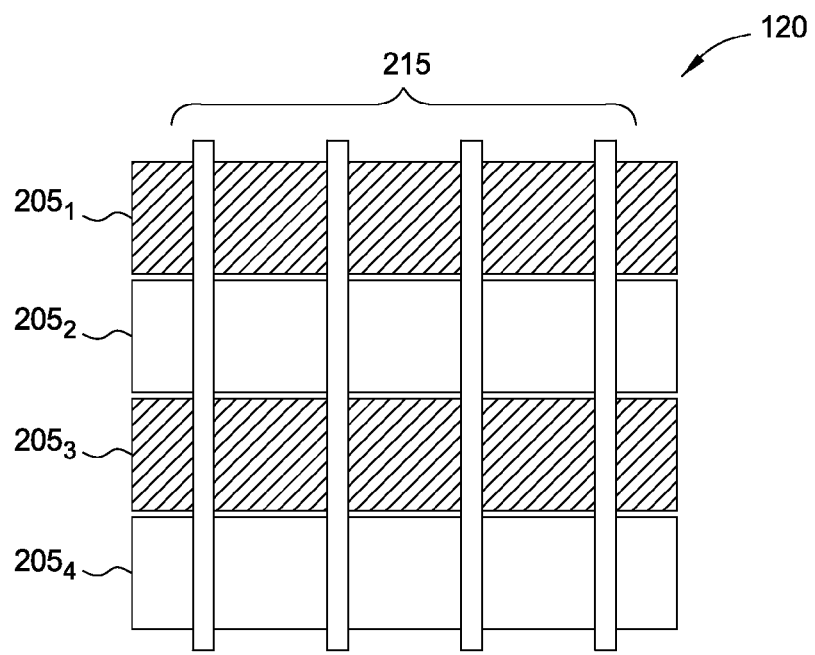
FIGS. 5A and 5B illustrate a portion of a pattern of sensing elements configured to perform interleaved capacitive sensing for a sensing region, according to one embodiment.
Figure 5B:
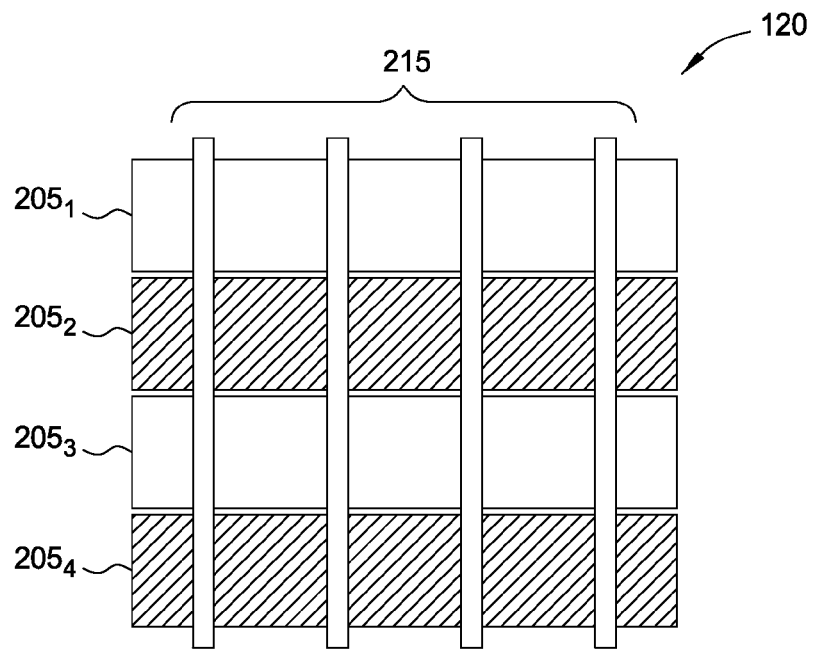

FIGS. 5A and 5B illustrate a portion of a pattern of sensing elements configured to perform interleaved capacitive sensing for a sensing region, according to one embodiment. While sensor module 235 is not explicitly depicted in FIGS. 5A and 5B, the same sensor module may be used to perform the interleaved capacitive sensing shown in FIGS. 5A and 5B (as well as FIGS. 6A-6D, discussed below).

FIG. 5A illustrates a portion of a pattern of sensing elements configured to perform interleaved capacitive sensing for a sensing region 120 at a first time. The sensor module drives a capacitive sensing signal onto a subset of the plurality of sensor electrodes 205 to create a first partial capacitive profile. As shown, the sensor electrodes $205_1$, $205_3$ are driven with the capacitive sensing signal at the first time (indicated by a hatched pattern). While the capacitive sensing signal is driven onto sensor electrodes $205_1$, $205_3$, the sensor module also drives the sensor electrodes $205_2$, $205_4$ with a substantially constant voltage. The sensor module may further drive some or all of the sensor electrodes 215 (disposed above the sensor electrodes 205) with the substantially constant voltage. FIG. 5B illustrates the pattern of sensing of sensing elements at a second time, when sensor electrodes $205_2$, $205_4$ are driven with the capacitive sensing signal to acquire the second partial capacitive profile. The sensing pattern depicted here is comparable to that of FIGS. 3A and 3B above (one partial profile corresponds to the "odds" of sensor electrodes 205, and one to the "evens").

Of course, alternate sensing patterns, such as those described above, may be used in other embodiments. FIGS. 6A-6D illustrate a portion of a pattern of sensing elements configured to perform interleaved capacitive sensing for a sensing region, according to one embodiment. During the scan of sensor electrodes 215, each sensor electrode may be separately driven with a capacitive sensing signal. Capacitive sensing data received from each sensor electrode may then correspond to a separate partial capacitive profile (i.e., in a 1:1 ratio). The partial capacitive profiles may be combined to construct a complete capacitive profile for the sensing region 120.

Figure 6A:
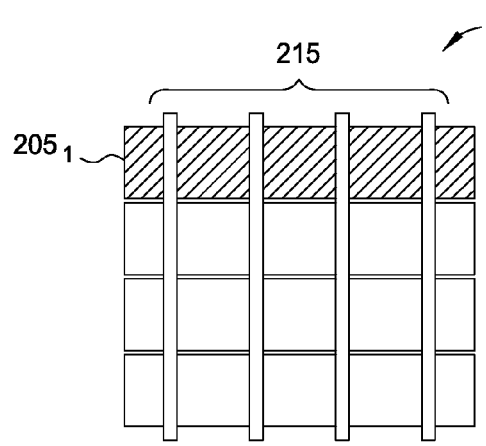
FIGS. 6A-6D illustrate a portion of a pattern of sensing elements configured to perform interleaved capacitive sensing for a sensing region, according to one embodiment.
Figure 6B:
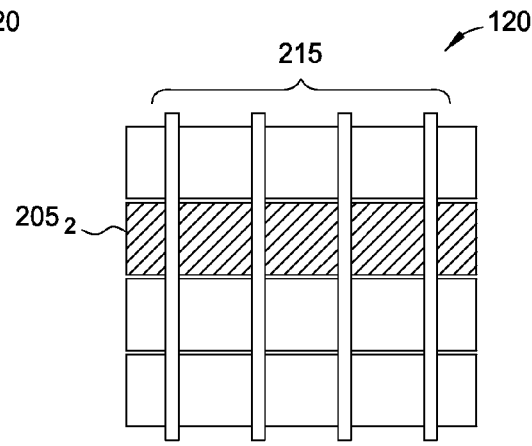
Figure 6C:
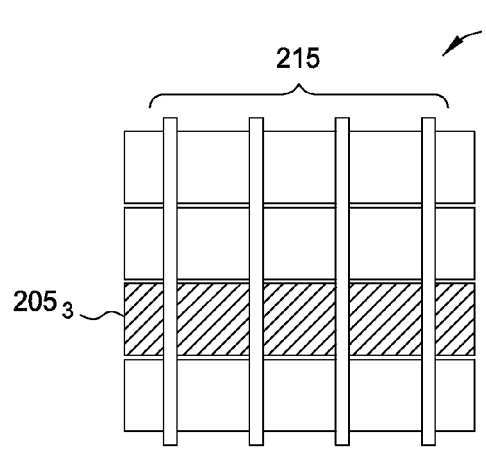
Figure 6D:
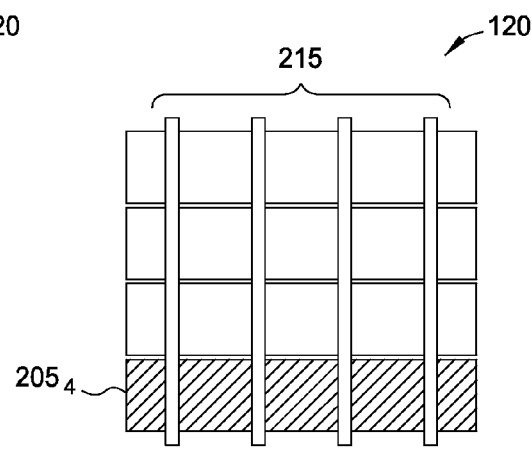

FIG. 6A illustrates the interleaved capacitive sensing at a first time, where sensor electrode $205_1$ is driven with the capacitive sensing signal and the remaining sensor electrodes are driven with the substantially constant voltage. The sensor module may further drive some or all of the sensor electrodes 215 (disposed above the sensor electrodes 205) with the substantially constant voltage. FIG. 6B illustrates the interleaved capacitive sensing at a second time (driving sensor electrode $205_2$ with the capacitive sensing signal), FIG. 6C at a third time (driving sensor electrode $205_3$ with the capacitive sensing signal), and FIG. 6D at a fourth time (driving sensor electrode $205_4$). For each of these times, and corresponding to each individual sensor electrode 205, a separate partial capacitive profile may be created. After completing the scan of the plurality of sensor electrodes 205, the various partial capacitive profiles may be combined to create a complete capacitive profile for the sensing region 120.

When acquiring capacitive images for sensing region 120, the sensor module may alternate performing sensing patterns on the second plurality of sensor electrodes 205 and the first plurality of sensor electrodes 215. In one embodiment, the sensor module may acquire a number of partial capacitive profiles by driving sensor electrodes 215, and then acquire a number of partial capacitive profiles by driving sensor electrodes 205. In another embodiment, the sensor electrodes 205, 215 may be driven in an interleaved pattern when acquiring partial capacitive profiles. The sensor module may drive sensor electrodes in any feasible sequence; one example sequence could be $205_1$, $215_4$, $205_2$, $215_3$, $205_3$, $215_2$, $205_4$, and $215_1$. Of course, different sequences may be selected. As above, the number of partial capacitive profiles and sequences for driving sensor electrodes 205, 215 may be chosen based on computing requirements and/or timing considerations.

Figure 7:
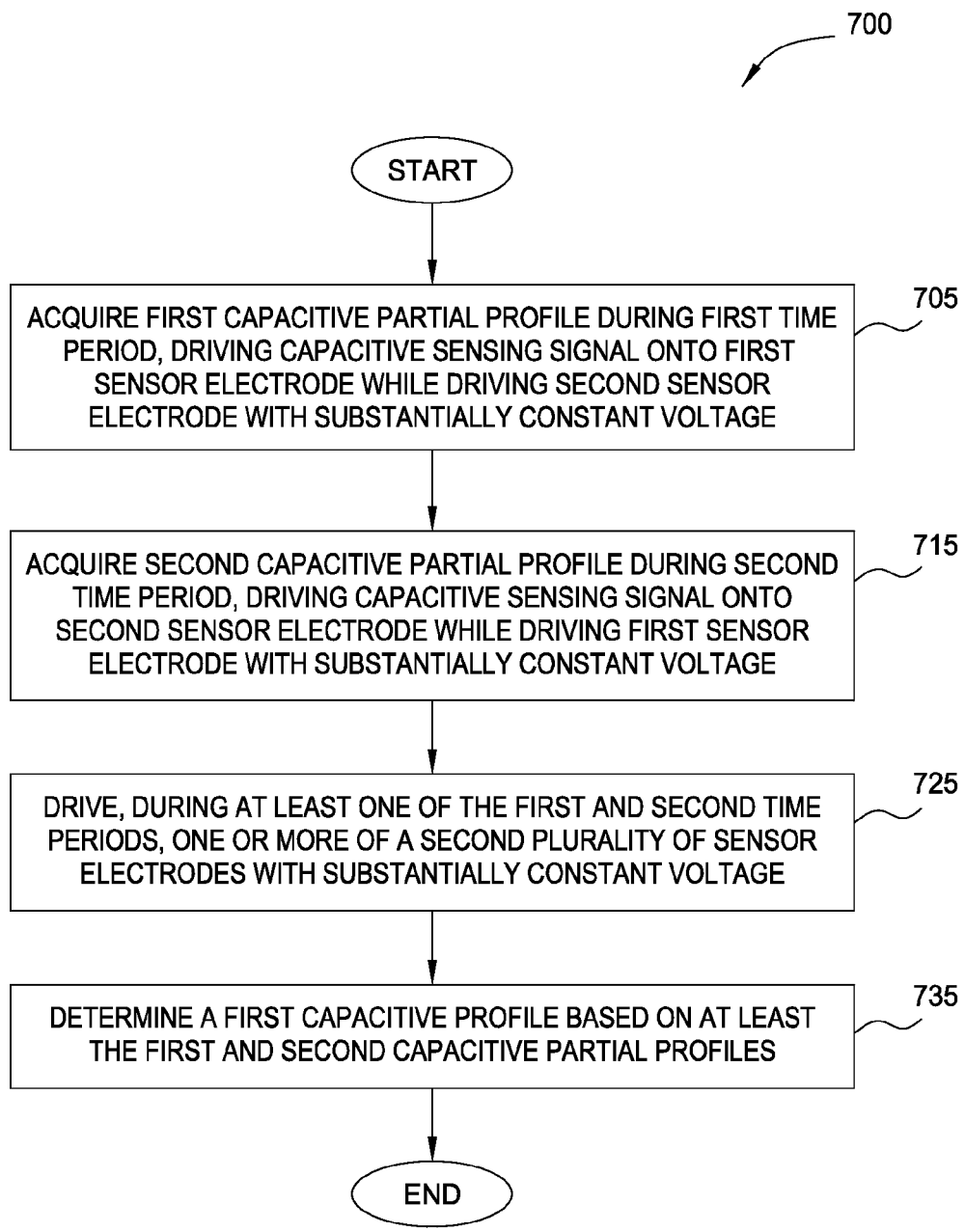
FIG. 7 illustrates a method for interleaved capacitive sensing, according to one embodiment described herein.

FIG. 7 illustrates a method 700 for interleaved capacitive sensing, according to one embodiment described herein. The method 700 may generally be performed by the input devices described above (for example, using a sensor module). The above description of the input devices (including components and functions) is intended to complement the relatively brief description of the method that follows.

Method 700 begins at block 705, where a first capacitive partial profile is acquired during a first time period by driving a capacitive sensing signal onto a first sensor electrode while driving a second sensor electrode with a substantially constant voltage. The first sensor electrode may be included in a first subset (of a first plurality of sensor electrodes) that are simultaneously driven with the capacitive sensing signal, while the second sensor electrode may be included in a second subset of the first plurality that are simultaneously driven with the substantially constant voltage.

By driving the second sensor electrode or second subset, with the substantially constant voltage, the input device may improve coupling for input objects, including those that are ungrounded or weakly grounded. By improving detectability of input objects, measurement accuracy and capacitive sensing performance may also be improved.

At block 715, a second capacitive partial profile is acquired during a second time period by driving a capacitive sensing signal onto the second sensor electrode while driving the first sensor electrode with the substantially constant voltage. Again, the first sensor electrode may be one of a first subset driven with the substantially constant voltage, while the second sensor electrode may be one of a second subset driven with the capacitive sensing signal. The description of blocks 705 and 715 is intended to encompass different sensing patterns and/or sequences on the plurality of sensor electrodes, such as a scan of each of the plurality of sensor electrodes, as well as an alternating arrangement of the first and second subsets of sensor electrodes (e.g., "odds" and "evens").

At block 725, one or more sensor electrodes from a second plurality of sensor electrodes may also be driven with the substantially constant voltage. Block 725 may occur contemporaneously with at least one of the first and second time periods (i.e., contemporaneously with blocks 705 and/or 715). The different pluralities of sensor electrodes may be disposed in a common plane, or may be in different planes separated by an insulating material. The second plurality of sensor electrodes may be arranged along a different sensing axis than the first plurality of sensor electrodes. In one embodiment, the first plurality of sensor electrodes is substantially orthogonal to the second plurality of sensor electrodes.

The same one or more sensor electrodes from the second plurality of sensor electrodes may be driven with the substantially constant voltage during the first and second time periods. Of course, different sensor electrodes from the second plurality of sensor electrodes may be selected to be driven during the first and second time periods. The selection may be based on the relative location of the second sensor electrode within the sensing region. For example, the input device may drive a predetermined number of sensor electrodes (from the second plurality of sensor electrodes) that are proximally closest to the second sensor electrode that is being driven with the capacitive sensing signal. Selecting proximate sensor electrodes to drive with the substantially constant voltage may generally improve coupling for input objects, as capacitive coupling is inversely proportional to the distance between the coupled objects (i.e., between input object and sensor electrode).

At block 735, a first capacitive profile for the sensing region is determined based on at least the first and second capacitive partial profiles. Any number of additional partial profiles may also be included to create the capacitive profile for the sensing region. In some embodiments, the first capacitive profile may include partial profiles that correspond to capacitive sensing performed using a second plurality of sensor electrodes disposed along a different sensing axis than that of the first plurality of sensor electrodes. For example, the first and second partial profiles may be acquired along a first sensing axis, while one or more additional partial profiles may be acquired along a second sensing axis that is substantially orthogonal to the first sensing axis. In a different example, the first partial profile may be acquired along a first sensing axis, while the second partial profile is acquired along a second sensing axis. Method 700 ends following block 735.

Further, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system, comprising:
   a sensor module comprising sensor circuitry coupled to a plurality of sensor electrodes, the sensor module configured to:
      simultaneously drive, during a first time period, a capacitive sensing signal onto a first sensor electrode of a first plurality of sensor electrodes and a substantially constant voltage onto a second sensor electrode of the first plurality of sensor electrodes;
      acquire, during the first time period, a first capacitive partial profile based on the capacitive sensing signal driven onto the first sensor electrode;
      simultaneously drive, during a second time period, the capacitive sensing signal onto the second sensor electrode and the substantially constant voltage onto the first sensor electrode, wherein the first and second time periods are non-overlapping;
      acquire, during the second time period, a second capacitive partial profile based on the capacitive sensing signal driven onto the second sensor electrode; and
      drive, during at least one of the first and second time periods, one or more sensor electrodes of a second plurality of sensor electrodes with the substantially constant voltage, the second plurality of sensor electrodes disposed substantially orthogonal to the first plurality of sensor electrodes; and
   a determination module configured to determine a first capacitive profile based on at least the first and second capacitive partial profiles.

2. The processing system of claim 1, wherein acquiring the second capacitive partial profile comprises driving the capacitive sensing signal onto a third sensor electrode of the first plurality of sensor electrodes, and wherein the second sensor electrode and the third sensor electrode are simultaneously driven with the capacitive sensing signal while the first sensor electrode is driven with the substantially constant voltage, the first sensor electrode located substantially between the second and third sensor electrodes.

3. The processing system of claim 1, wherein the sensor module is further configured to:
   simultaneously drive, during the first time period, the capacitive sensing signal onto a first subset of the first plurality of sensor electrodes that includes the first sensor electrode, and the substantially constant voltage onto a second subset of the first plurality of sensor electrodes that includes the second sensor electrode;
   acquire, during the first time period, the first capacitive partial profile based on the capacitive sensing signal driven onto the first subset;
   simultaneously drive, during the second time period, the capacitive sensing signal onto the second subset and the substantially constant voltage onto the first subset; and
   acquire, during the second time period, the second capacitive partial profile based on the capacitive sensing signal driven onto the second subset,
   wherein the first plurality of sensor electrodes are arranged in parallel, and wherein sensor electrodes of the first subset are disposed in an alternating arrangement with sensor electrodes of the second subset.

4. The processing system of claim 3, wherein the sensor electrodes are selected for inclusion in the first and second subsets based on a capacitive baseline image.

5. The processing system of claim 1, wherein the sensor module is further configured to:
   acquire a third capacitive partial profile by driving the capacitive sensing signal onto a fourth sensor electrode of the second plurality of sensor electrodes, while driving a fifth sensor electrode of the second plurality of sensor electrodes with the substantially constant voltage; and
   acquire a fourth capacitive partial profile by driving a capacitive sensing signal onto the fifth sensor electrode while driving the fourth sensor electrode with the substantially constant voltage; and
   wherein the determination module is further configured to determine a second capacitive profile for the sensing region based on at least the third and fourth capacitive partial profiles.

6. The processing system of claim 1, wherein the sensing module is further configured to determine a second capacitive baseline image based on a comparison of a first capacitive baseline image with the first capacitive profile.

7. The processing system of claim 6, wherein the first capacitive baseline image is obtained using transcapacitive sensing.

8. A method for driving a plurality of sensor electrodes for capacitive sensing, the method comprising:

acquiring, during a first time period, a first capacitive partial profile by driving a capacitive sensing signal onto a first sensor electrode of a first plurality of sensor electrodes, while driving a second sensor electrode of the first plurality of sensor electrodes with a substantially constant voltage;

acquiring, during a second time period, a second capacitive partial profile by driving the capacitive sensing signal onto the second sensor electrode while driving the first sensor electrode with the substantially constant voltage, wherein the first and second time periods do not overlap;

driving, during at least one of the first and second time periods, one or more sensor electrodes of a second plurality of sensor electrodes with the substantially constant voltage, the second plurality of sensor electrodes disposed substantially orthogonal to the first plurality of sensor electrodes; and determining a first capacitive profile based on at least the first and second capacitive partial profiles.

9. The method of claim 8, wherein acquiring the second capacitive partial profile comprises driving the capacitive sensing signal onto a third sensor electrode of the first plurality of sensor electrodes, wherein the second sensor electrode and the third sensor electrode are simultaneously driven with the capacitive sensing signal while the first sensor electrode is driven with a substantially constant voltage, the first sensor electrode located substantially between the second and third sensor electrodes.

10. The method of claim 8, further comprising:
acquiring the first capacitive partial profile by driving the capacitive sensing signal onto a first subset of the first plurality of sensor electrodes that includes the first sensor electrode, while driving a second subset of the first plurality of sensor electrodes that includes the second sensor electrode with the substantially constant voltage;
acquiring the second capacitive partial profile by driving the second subset of sensor electrodes with the capacitive sensing signal while driving the first subset with the substantially constant voltage,
wherein the first plurality of sensor electrodes are arranged in parallel, and wherein sensor electrodes of the first subset are disposed in an alternating arrangement with sensor electrodes of the second subset.

11. The method of claim 10, further comprising selecting the sensor electrodes for inclusion in the first and second subsets based on a capacitive baseline image.

12. The method of claim 8, further comprising:
acquiring a third capacitive partial profile by driving the capacitive sensing signal onto a fourth sensor electrode of the second plurality of sensor electrodes, while driving a fifth sensor electrode of the second plurality of sensor electrodes with the substantially constant voltage;
acquiring a fourth capacitive partial profile by driving a capacitive sensing signal onto the fifth sensor electrode while driving the fourth sensor electrode with the substantially constant voltage; and
determining a second capacitive profile based on at least the third and fourth capacitive partial profiles.

13. The method of claim 8, further comprising determining a second capacitive baseline image based on a comparison of a first capacitive baseline image with the first capacitive profile.

14. The method of claim 13, wherein the first capacitive baseline image is obtained using transcapacitive sensing.

15. An input device comprising:
a plurality of sensor electrodes, including a first plurality of sensor electrodes arranged along a first sensing axis; and
a processing system coupled to the plurality of sensor electrodes and configured to:
acquire, during a first time period, a first capacitive partial profile by driving a capacitive sensing signal onto a first sensor electrode of the first plurality of sensor electrodes, while driving a second sensor electrode of the first plurality of sensor electrodes with a substantially constant voltage;
acquire, during a second time period, a second capacitive partial profile by driving the capacitive sensing signal onto the second sensor electrode while driving the first sensor electrode with the substantially constant voltage, wherein the first and second time periods do not overlap; and
determine a first capacitive profile based on at least the first and second capacitive partial profiles.

16. The input device of claim 15, wherein acquiring the second capacitive partial profile comprises driving the capacitive sensing signal onto a third sensor electrode of the first plurality of sensor electrodes, and wherein the second sensor electrode and the third sensor electrode are simultaneously driven with the capacitive sensing signal while the first sensor electrode is driven with the substantially constant voltage.

17. The input device of claim 15, wherein the processing system is further configured to:
acquire the first capacitive partial profile by driving the capacitive sensing signal onto a first subset of the first plurality of sensor electrodes that includes the first sensor electrode, while a second subset of the first plurality of sensor electrodes that includes the second sensor electrode is driven with the substantially constant voltage; and
acquire the second capacitive partial profile by driving the capacitive sensing signal onto the second subset while the first subset is driven with the substantially constant voltage,
wherein the first plurality of sensor electrodes are arranged in parallel, and wherein sensor electrodes of the first subset are disposed in an alternating arrangement with sensor electrodes of the second subset.

18. The input device of claim 17, wherein the sensor electrodes are selected for inclusion in the first and second subsets based on a capacitive baseline image.

19. The input device of claim 15, wherein the processing system is further configured to:
acquire a third capacitive partial profile by driving the capacitive sensing signal onto a fourth sensor electrode of a second plurality of sensor electrodes arranged along a second sensing axis, the second sensing axis substantially orthogonal to the first sensing axis, while driving a fifth sensor electrode of the second plurality of sensor electrodes with the substantially constant voltage;
acquire a fourth capacitive partial profile by driving a capacitive sensing signal onto the fifth sensor electrode while driving the fourth sensor electrode with the substantially constant voltage; and
determine a second capacitive profile for the sensing region based on at least the third and fourth capacitive partial profiles.

20. The input device of claim 15, wherein the processing system is further configured to determine a second capacitive baseline image based on a comparison of a first capacitive baseline image with the first capacitive profile.

21. The input device of claim 20, wherein the first capacitive baseline image is obtained using transcapacitive sensing.

* * * * *